United States Patent
Hammerman et al.

(10) Patent No.: US 8,534,078 B2
(45) Date of Patent: Sep. 17, 2013

(54) SELF GENERATING POWER GENERATOR FOR CRYOGENIC SYSTEMS

(75) Inventors: John Hammerman, Bozeman, MT (US); Boyd Bowdish, Los Gatos, CA (US); Eric Pierson, Bozeman, MT (US)

(73) Assignee: Reflect Scientific, Inc., Orem, UT (US)

( * ) Notice: Subject to any disclaimer, the term of this patent is extended or adjusted under 35 U.S.C. 154(b) by 729 days.

(21) Appl. No.: 12/431,756

(22) Filed: Apr. 29, 2009

(65) Prior Publication Data

US 2010/0275591 A1    Nov. 4, 2010

(51) Int. Cl.
F17C 9/04    (2006.01)
F17C 13/08    (2006.01)

(52) U.S. Cl.
USPC ............................................. 62/50.3; 62/53.2

(58) Field of Classification Search
USPC ........................................ 62/50.3, 50.1, 53.2
See application file for complete search history.

(56) References Cited

U.S. PATENT DOCUMENTS

| | | | | |
|---|---|---|---|---|
| 3,714,793 A | * | 2/1973 | Eigenbrod | 62/62 |
| 3,719,051 A | * | 3/1973 | Malaker | 62/6 |
| 7,152,404 B2 | * | 12/2006 | Francois et al. | 60/525 |
| 7,325,399 B2 | * | 2/2008 | Strimling et al. | 60/520 |
| 2003/0200751 A1 | * | 10/2003 | Thompson et al. | 60/671 |

FOREIGN PATENT DOCUMENTS

GB    1530126 A    * 10/1978

OTHER PUBLICATIONS

"Stirling Engine Application", post of Lord Draconis on Dec 25, 2005, 10:43pm.*
"Stirling Home System"—posted by Zen Tom on Dec. 2, 2008.*
"Stirling-Stirling Cooler"—posted by Greattqn on Mon. Dec. 26, 2005.*
Popular Science Jun. 1978 pp. 74-77 "60-cycle AC from sunchine, Solar Stirling Engine" by E.F. Lindsley.*

* cited by examiner

*Primary Examiner* — Frantz Jules
*Assistant Examiner* — Keith Raymond
(74) *Attorney, Agent, or Firm* — Tran & Associates

(57) ABSTRACT

A cryogenic self powered system includes a cooled chamber having a hot face and a cold face; a power generator coupled to the hot face and the cold face to generate electricity therefrom; and a working fluid coupled to the cooled chamber and to the power generator.

20 Claims, 4 Drawing Sheets

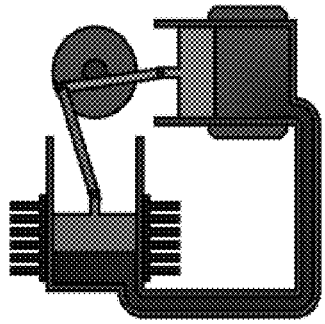
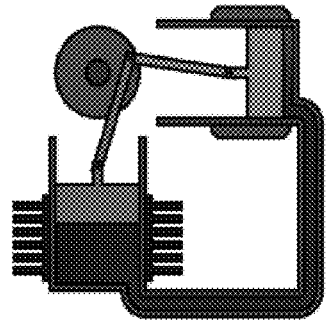
FIG. 3A
FIG. 3B
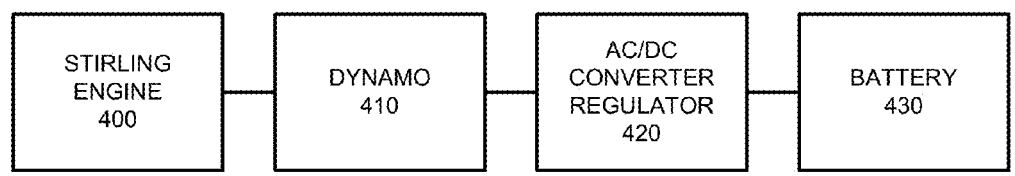
FIG. 4

3) Cryogenics Supply
4) Cryogenics Storage
5) Vacuum Jacket Lines
6) Manual Shut Off Valve
7) Valve Supply Line
8) Redundant Valve
9) Control Valve
10) Distributor/Orifice
11) Heat Exchange/Evaporator Coil
12) EvaporatorCuicuits
13) Heat Exchange Fan
14) Thermocouple
15) Vent Line
16) Reuse Outlet
17) Relief Valve
18) Control

SELF GENERATING POWER GENERATOR FOR CRYOGENIC SYSTEMS

The present invention relates to power generation for systems with cryogenic elements.

BACKGROUND OF THE INVENTION

Due to an increasing demand for technology that is both electrically efficient and environmentally responsible, there exists a need to develop technologies that address the cooling of environments such as Data Centers or other IT operations, thermal stress test chamber, or a Logistical Delivery Transport truck. In refrigerated trucks or trailers which commonly transport sensitive food products, refrigeration failure can be costly in terms of food spoilage and business disruption. Excursions in temperature or outright failure may be catastrophic in the biomedical field. For example, the destruction of a limited supply of special vaccine, stored under very low temperature for emergency protection of the general public, is highly undesirable.

Similarly, in the telecommunications, information storage and exchange industries i.e. Data Centers, there is an increasing need for reliable cooling of racks of servers in these environments. A failure of the cooling equipment can lead to failures in the servers, which can mean downtime for mission critical software and hardware failure for customer web application software. In the electronics stress testing field, reliable environmental simulation chambers need to achieve very low temperatures to properly test their loads/products. Additionally, back up cooling systems may be needed to supplement existing conventional cooling systems. These chambers may need to support a temperature range from room temperature (25 degrees C.) down to a cryogenic temperature as low as −150 degrees C.

Given these technological requirements and specifications, there has been the introduction of the requirement to be environmentally responsible with the use of electrical power and to reduce the carbon footprint of these operations. This need to reduce electrical power consumption in the controlling of heat in an environment and replace that consumption with a renewable resource has given way to the embodied concept of flow control of a cryogenic element for removing heat.

SUMMARY

In one aspect, a cryogenic self powered system includes a cooled chamber having a hot face and a cold face; a power generator coupled to the hot face and the cold face to generate electricity therefrom; and a working fluid coupled to the cooled chamber and to the power generator.

Advantages of the preferred embodiment may include one or more of the following. The system provides a systematic way of taking a cryogenic element that is used in a cryogenic process and using it to create the electrical power required for the cryogenic process. Through the use of cryogenically cooled Stirling engine, the need for an external electrical power source is eliminated. The cryogenic processes is environmentally beneficial by eliminating the external electrical power requirement, which, based on average electrical grid compositions is usually associated with the generation of carbon emissions. By recycling or tapping into the inherent cryogenic process component, the cryogenic process becomes self sustaining. The system does not need external power, and with a process only dependent on its inherent constituent components for operation, system reliability is improved. The system can be used for Cold Chain Management such as in Controlled Environment Transportation (CET), Biopharmaceutical Processes, Non-Profit Organizations, Governmental Agencies, and Metallurgical Processing, among others.

BRIEF DESCRIPTION OF THE DRAWINGS

FIG. 3A-3B shows two operating phases of an exemplary Stirling engine electric generator.

FIG. 4 shows an exemplary cryogenic Sterling engine battery recharger.

DESCRIPTION

Figure 1:
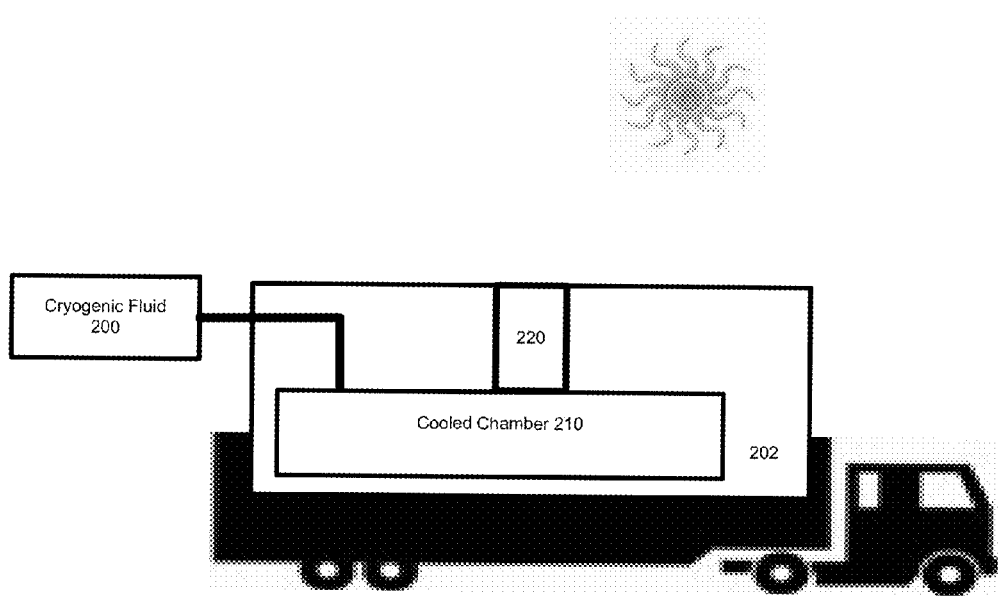
FIG. 1 shows an exemplary cryogenic system.

FIG. 1 shows an exemplary mobile cryogenic system mounted on a truck. The cryogenic processes consume a cryogenic element as a function of that work. Typically, these processes also require an electrical power source to drive operational items such as valves, controls and other components. The cryogenic processes are then dependent on having a minimum of two energy sources to operate.

The system of FIG. 1 includes a cryogenic fluid source 200 that is pumped to cool a chamber 210. The cryogenic fluid is also used to cool a cold face portion of an electric generator 220. A hot face portion of the electric generator 220 receives ambient heat such as solar heat. The cooled chamber is insulated from the ambient temperature by an insulator 202.

Figure 2:
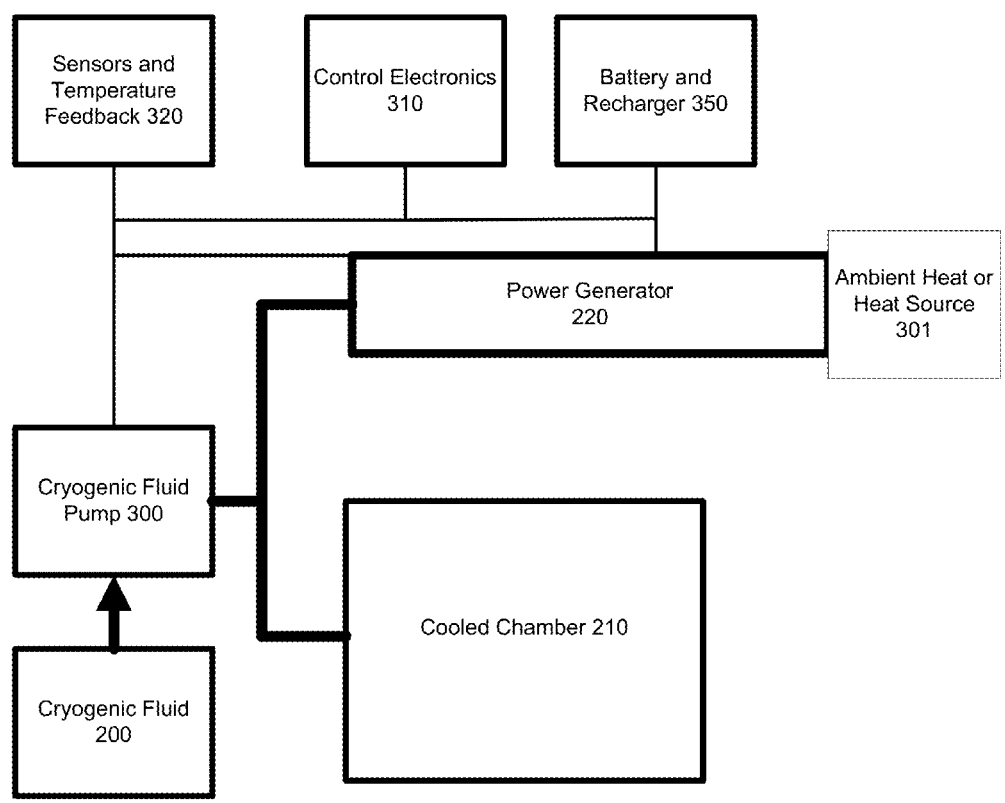
FIG. 2 shows an exemplary circuit for powering the cryogenic system of FIG. 1.

FIG. 2 shows an exemplary circuit for powering the cryogenic system of FIG. 1. The cryogenic fluid source 200 is provided to a cryogenic fluid pump 300 which can be controlled by control electronics 310. The control can be based on information provided by sensors and other feedback devices 320. The pump 300, control electronics 310 and sensors 320 are powered by the power generator 220. The power generator 220 can also recharge a battery/recharger combination 350 which in turn supplies power and acts as an uninterruptible power source (UPS) to the pump 300, electronics 310 and sensors 320.

In one embodiment, cryogenic processing requires a relative small amount of electrical power to operate the process control and operational components. In this embodiment, a Sterling engine based electrical power source is used to recharge a battery bank, as detailed in FIG. 4. Conventional electronics convert the direct current voltage supply of the battery bank into the required operational voltages of the cryogenic process. Battery bank capacity is process dependent. By using the Sterling engine as a recharge device, the load on the engine remains constant minimizing fuel consumption. Bulk liquid cryogen is used to "fuel" the Sterling engine.

In another embodiment, the Sterling engine based power source is used to supply the demands of the cryogenic process directly. Conventional electronics condition the output voltage supply into the required operational voltages of the cryogenic process. By using the Sterling engine as a direct supply of electrical power, a minimum of components are required, thus leading to uptime improvement for the cryogenic process while allowing the process to operate in a self sustaining fashion.

These cryogenic processes can be for continuous operation in environments where the availability of electrical power is limited, inconsistent or non-existent. Diverse processes such as cold chain management, biopharmaceutical manufacturing, processing and storage facilities, blood plasma processing facilities and metal processing facilities are examples of applications which could benefit from the reduction of external electrical power requirements and associated impacts on costs and the environment. The creation of electrical power by using the available cryogens from the process bulk supply to generate the required electrical service allows the process to continue regardless of external factors or conditions, dependent only on the availability of the inherent cryogen.

The Stirling engine converts heat energy into mechanical power by alternately compressing and expanding a fixed quantity of gas (the working fluid) at different temperatures. In recent years, the advantages of Stirling engines have become increasingly significant, given the global political environment and as the engineering requirements for environmental responsibility are realized. Stirling engines address these issues by being very compatible with the renewable energy used in cryogenic processes. The Stirling engine is noted for its high efficiency, quiet operation and the ease with which it can utilize what would otherwise be wasted energy.

In this embodiment, engine initialization is realized by "fueling" the engine from a bulk liquid nitrogen tank which uses the natural fluid dynamics of a cryogen to pressurize the upstream cryogenic element. The heat exchanger of the engine has been sized appropriately to supply the necessary heat transfer rates thus producing the appropriate mechanical action necessary to produce the needed electrical current from the alternator.

With the use of liquid nitrogen as a cryogenic element, the system applies a renewable resource which after its use in the cryogenic process is returned to the "feed stock air" for future recovery and use. With the use of this technique, the cryogenic processes become environmentally responsible by eliminating the external electrical power requirement, which, based on average electrical grid compositions is usually associated with the generation of carbon emissions. By recycling or tapping into the inherent cryogenic process component, the cryogenic process becomes self sustaining.

Self servicing systems are always desirable, demonstrating an evolutionary step forward in process improvement. With a process only dependent on its inherent constituent components for operation, system reliability is improved.

FIG. 3A-3B shows two operating phases of an exemplary Stirling engine electric generator. In one embodiment, an alpha Stirling engine is used which contains two power pistons in separate cylinders, one connected to the hot face portion and one connected to the cold face portion. The hot cylinder is situated inside a high temperature heat exchanger and the cold cylinder is situated inside a low temperature heat exchanger. Most of the working gas is in contact with the hot cylinder walls, it has been heated and expansion has pushed the hot piston to the bottom of its travel in the cylinder. The expansion continues in the cold cylinder, which is 90° behind the hot piston in its cycle, extracting more work from the hot gas. When the gas is at its maximum volume, the hot cylinder piston begins to move most of the gas into the cold cylinder, where it cools and the pressure drops. The cold piston, powered by flywheel momentum (or other piston pairs on the same shaft) compresses the remaining part of the gas. The gas reaches its minimum volume, and it will now expand in the hot cylinder where it will be heated once more, driving the hot piston in its power stroke.

In one embodiment, the Stirling engine has a regenerator which is an internal heat exchanger and temporary heat store placed between the hot and cold spaces such that the working fluid passes through it first in one direction then the other. The regeneration greatly increases the thermal efficiency by 'recycling' internally heat which would otherwise pass through the engine irreversibly. As a secondary effect, increased thermal efficiency promises a higher power output from a given set of hot and cold end heat exchangers. The regenerator works like a thermal capacitor and ideally has very high thermal capacity, very low thermal conductivity, almost no volume, and introduces no friction to the working fluid.

In a high power generation embodiment, a greater surface area is needed to facilitate the transfer of sufficient heat. Implementations of the high power embodiments can include internal and external fins or multiple small bore tubes. Preferably, heat may be supplied at ambient and the cold sink maintained at a lower temperature by the cryogenic fluid or ice water.

In another embodiment, instead of the Stirling engine, a modified gasoline engine can be used. In this embodiment, cryogenic fluid is used in lieu of gas. The cryogenic fluid then enters the expansion valve where it drops in pressure and changes state from a liquid to a vapor in the evaporator. Ambient heat causes the cryogenic fluid to expand greatly, pushing the engine's cylinder up. A vent is opened to let the gas escapes, driving the cylinder down, and then the cycle is repeated. The motion of the cylinder generates rotary power that is then applied to a dynamo or suitable electrical power generator.

FIG. 4 shows an exemplary cryogenic Sterling engine battery recharger. The Stirling engine 400 provides rotary power which is applied to a dynamo 410 to generate electricity. The dynamo 410 is essentially an electric motor run in reverse. The electric motor uses magnets spinning in a metal coil to spin an axle. Conversely, spinning the axle causes the magnets to rotate in the coil and generates an electric current moving away from the motor. The dynamo 410 in basic form consists of a powerful field magnet between the poles of which a suitable conductor, usually in the form of a coil (armature), is rotated. The magnetic lines of force are cut by the rotating wire coil, which induces a current to flow through the wire. The mechanical energy of rotation is thus converted into an electric current in the armature. An electromotive force is developed in a conductor when it is moved in a magnetic field.

In one embodiment, the dynamo produces alternating current (AC) which is provided to an AC/DC converter and regulator 620 to generate a regulated DC voltage. The DC voltage is used to recharge a battery 630.

In one embodiment, lithium-ion batteries (sometimes abbreviated Li-ion batteries) are a type of rechargeable battery in which a lithium ion moves between the anode and cathode. The lithium ion moves from the anode to the cathode during discharge and in reverse, from the cathode to the anode, when charging. Lithium ion batteries offer one of the best energy-to-weight ratios, no memory effect, and a slow loss of charge when not in use. The three primary functional components of a lithium ion battery are the anode, cathode, and electrolyte, for which a variety of materials may be used. Commercially, the most popular material for the anode is graphite. The cathode is generally one of three materials: a layered oxide, such as lithium cobalt oxide, one based on a polyanion, such as lithium iron phosphate, or a spinel, such as lithium manganese oxide, although materials such as $TiS_2$ (titanium disulfide) were originally used. Depending on the choice of material for the anode, cathode, and electrolyte the voltage, capacity, life, and safety of a lithium ion battery can change dramatically. Lithium ion batteries are not to be confused with lithium batteries, the key difference being that lithium batteries are primary batteries containing metallic lithium while lithium-ion batteries are secondary batteries containing an intercalation anode material. Other battery chemistries are contemplated as well, including NiMH and NiCd, among others.

Figure 5:
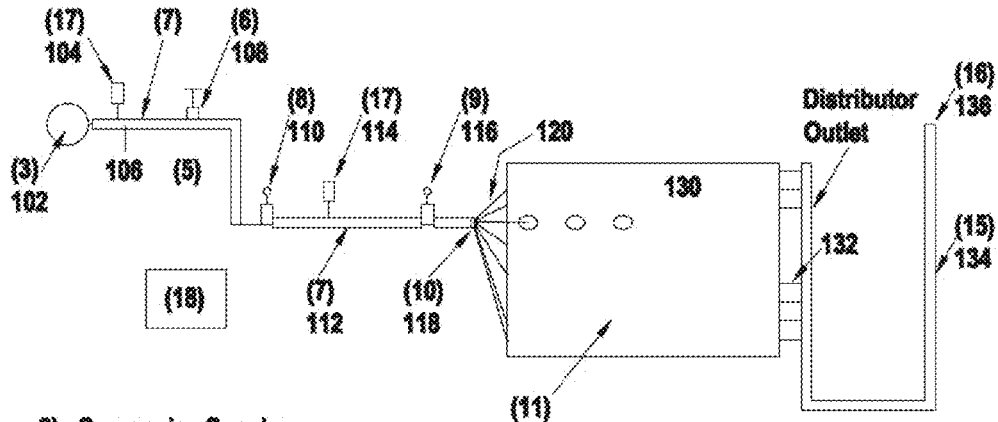
FIG. 5 shows an exemplary block diagram of a cryogenics distribution system.

FIG. 5 shows a block diagram of an exemplary cryogenic system 100 in accordance with one aspect of the invention. In this system, cryogenic liquid or material such as liquid nitrogen (LN2) is stored in a cryogenic tank 102. The tank is connected to a relief valve 104 and to a valved supply line 106. The cryogenic main feed to the redundant and control valves to the air evaporator's coil or refrigeration tubing is preferably a high reliability multi-tube thermal exchange structure as disclosed in U.S. Pat. No. 6,804,976, the content of which is incorporated by reference.

The supply line 106 can be a vacuum insulated piping (VIP) line to minimize the vaporization of the cryogens during the transfer of the cryogenic liquids due to heat gain and vaporization. With vacuum insulated piping, the vacuum insulation decreases heat gain caused from conduction, convection, or radiation. In one embodiment, a multi-layer insulation is demonstrably superior to conventional foam insulated copper piping in reducing heat gain to the transferred cryogenic flow.

Fittings for input and output connection to the air heat exchanger air conditioning and or refrigeration source are configured and welded or bayoneted with cryogenic connectors in place. Preferably, the connection between the vacuum insulated pipes is done with a bayonet connector that uses thermal contraction/expansion mechanisms. The contraction/expansion provides a mechanical connection for sections of vacuum insulated pipe with a low heat gain connection. The bayonets are constructed of stainless steel with the nose piece of the male bayonet being made from a dissimilar material such as the polymer INVAR36 to prevent mechanical seizing. A secondary o-ring seal is used at the flange of each bayonet half to provide a seal in which a gas trap is formed between the close tolerance fitting sections of the bayonet assembly. This gas trap is formed using the initial cryogen flow which is vaporized and forms a high pressure inpedence for the lower pressure liquid, thus forming a frost free connection with lowered heat gain to the cryogenic flow.

A manual shut-off valve 108 is connected to the supply line 106 to allow a user to shut-off the system in case of an emergency. The LN2 liquid passes through a redundant valve 110 and enters another valved supply line 112. The supply line 112 has a relief valve 114 and is gated by a control valve 116. In one embodiment, a VIP control valve set up is provided with a redundant safety valve. The safety valve is of the EMO (emergency machine off) type, closed with power removed. The LN2 liquid then travels through a distributor 118 which evenly controls the flow of the cryogenic element over a plurality of lead tubes 120. The lead tubes 120 then complete the enthalpy control to a heat exchanger/evaporator 130 such as the Multi Tube Hi Reliability Tubing discussed in U.S. Pat. No. 6,804,976, the content of which is incorporated by reference.

The lead tubes 120 exit the heat exchanger 130 at a distributed outlet 132. A portion of the Gasses can be vented to the outside through a vent line 134, and the majority is recirculated and reused through a reuse outlet 136. The cryogenic system can be tied to a reliquifier and the cryogenic elements can be reprocessed. Alternatively, the exhaust from the gas exhaust can be used for a different process as Controlled atmosphere to reduce Bio-Deterioration within the payload bay or chamber within the heat source environment.

The temperature range is from ambient e.g. +75 degrees Fahrenheit to −120 degrees Fahrenheit. This system controls the flow of a cryogenic element which in turn controls the enthalpic potential of said cryogenic element as it is applied to a heat source which can be Refrigerated Trailers, Environmental Chambers, and computer cooling rooms, among others.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cryogenic system, comprising:
   a container having a hot face facing the sun and a cold face facing a cooled chamber mounted inside a truck using a cryogenic working fluid to cool perishable content and to generate electricity for controlling chamber temperature, wherein the cryogenic working fluid is returned as feed stock air for recovery and reuse;
   a power generator including an engine coupled to the hot face and the cold face to convert a temperature differential into electricity therefrom; and
   the cryogenic working fluid coupled to the cooled chamber and to the power generator, wherein engine initialization is achieved by fueling the engine from a bulk liquid nitrogen tank which uses the natural fluid dynamics of a cryogen to pressurize an upstream cryogenic element.

2. The system of claim 1, wherein the working fluid comprises a liquid supply of a cryogenic fluid.

3. The system of claim 1, wherein the power generator comprises a Stirling engine.

4. The system of claim 3, wherein the Stirling engine is operated using cryogen as the working fluid.

5. The system of claim 3, comprising a dynamo coupled to the Stirling engine.

6. The system of claim 1, comprising a direct current converter coupled to the power generator.

7. The system of claim 1, comprising control electronics and a cryogenic pump receiving power from the power generator.

8. The system of claim 1, comprising a rechargeable battery coupled to the power generator.

9. The system of claim 8, comprising control electronics and a cryogenic pump receiving power from the rechargeable battery.

10. The system of claim 1, wherein the cooled chamber is used in cold chain management including transportation systems using insulated refrigerated containers.

11. The system of claim 1, wherein the cooled chamber is used for the life sciences industry including biopharmaceutical manufacturing, plasma processing and stem cell repositories.

12. A mobile self-powered cryogenic system, comprising:
   a container having a hot face facing the sun and a cold face facing a cooled chamber mounted inside a truck to cool perishable content and to generate electricity for controlling chamber temperature;
   a power generator coupled to the hot face and the cold face with a temperature differential to generate electricity therefrom; and
   a cryogenic working fluid coupled to the cooled chamber and to the power generator, wherein the cryogenic working fluid is returned as feed stock air for recovery and reuse.

13. The system of claim 12, wherein the power generator comprises an electrical generating power source for cryogenic processes.

14. The system of claim 12, comprising control electronics and a cryogenic pump receiving power from the power generator.

15. The system of claim 12, comprising a rechargeable battery coupled to the power generator.

16. The system of claim 15, comprising control electronics and a cryogenic pump receiving power from the battery.

17. The system of claim 12, wherein the cooled chamber is transportable.

18. The system of claim 12, wherein the cooled chamber is operated in any weather condition.

19. A method for cryogenically cooling a container having a hot face to receive solar radiation, comprising:

provid ing a cooled chamber with a cryogenic cold face in contact with a cryogenic working fluid, wherein the cooled chamber is mounted inside a truck to cool perishable content and to generate electricity for controlling chamber temperature, and wherein the cryogenic working fluid is returned as feed stock air for recovery and reuse;

generating power with a power generator through a temperature differential between the hot face and the cold face; and circulating a cryogenic working fluid to the cooled chamber and to the power generator including an engine, wherein engine initialization is achieved by fueling the engine from a bulk liquid nitrogen tank which uses the natural fluid dynamics of a cryogen to pressurize an upstream cryogenic element.

20. The method of claim 19, wherein generating power comprises connecting a Stirling engine to the hot and cold faces.

* * * * *